March 17, 1931. F. L. DUFFIELD 1,796,562
REDUCTION OF ORES OF METALS CAPABLE OF VOLATILIZATION
Filed July 1, 1929
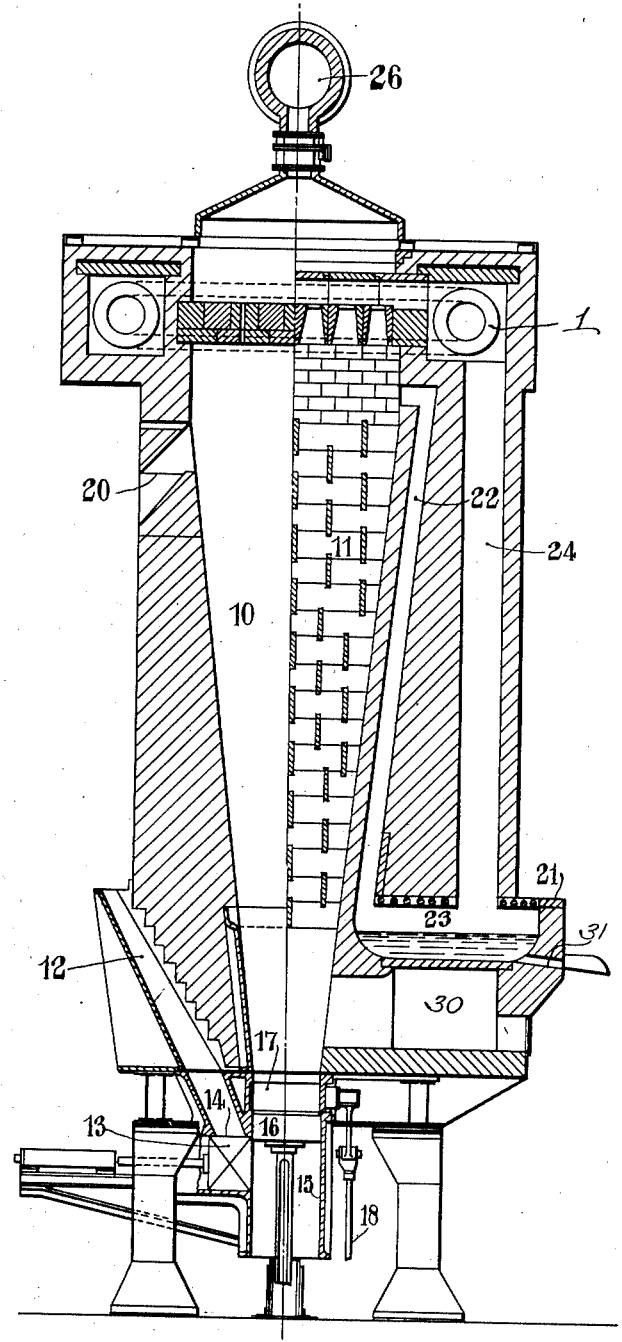
INVENTOR
FREDERICK LINDLEY DUFFIELD,
BY
Attorneys Patented Mar. 17, 1931

1,796,562

UNITED STATES PATENT OFFICE

FREDERICK LINDLEY DUFFIELD, OF KINGSWAY, LONDON, ENGLAND

REDUCTION OF ORES OF METALS CAPABLE OF VOLATILIZATION

Application filed July 1, 1929, Serial No. 375,227, and in Great Britain August 4, 1928.

This invention relates to the reduction of ores of metals capable of volatilization, for example, zinc, lead, bismuth, antimony, arsenic, mercury.

The object of the present invention is to provide an improved process for reducing such ores.

In my co-pending application for patent S. No. 307,413 filed 21st September, 1928, I have described and claimed a process for the reduction of iron ores, in which the charge is introduced into the base of a vertical retort and pushed upwards therein by a vertical ram, so that the ore charge and the gases evolved both move in the same direction, the gases being withdrawn from the top of the reduction chamber and burned in a contiguous combustion chamber, whereby a more or less uniform temperature difference between the reduction and combustion chambers exists throughout their height.

According to the present invention I propose to adopt the process of my above-mentioned patent application for recovering zinc, lead and such other volatilizable metals as bismuth, antimony, arsenic and mercury from their natural raw ores, with or without prior roasting or mechanical or other means of concentration or elimination of sulphur.

According to the present invention the method of recovering zinc, lead and other metals capable of volatilization from natural ores consists in pulverizing the ore and passing the pulverized charge of ore and carbonaceous material with or without lime or limestone through a reducing chamber heated by burning gases in an adjacent chamber or chambers in the same direction as the direction of movement of the gases evolved in the said reducing chamber, introducing the evolved gases and the volatilized metal into a common chamber, separating the metal and burning the evolved gases in the above-mentioned combustion chamber or chambers whereby the necessary heat is supplied for the reducing operation.

It will be seen therefore that I modify the process described in my said patent application by withdrawing together the volatilized metal and hot gases from the reducing chamber, and passing them into a suitably formed chamber, whence the gases are separately conducted to the top of the combustion chamber and burned therein, as in my said patent application.

The present invention will be illustrated by way of example with reference to the accompanying drawing, the left half of which is a section through the reducing chamber, the right half being a section through a combustion chamber.

Referring to the drawing:—

The apparatus comprises inter alia a reducing chamber 10, and a combustion chamber 11 arranged contiguously thereto. The charge is fed to the chamber 10 through a chute 12, a horizontal ram 13 working intermittently in a cylinder 14, and adapted to feed the charge intermittently into a cylinder 15 on top of a vertical intermittently reciprocating ram 16, the charge being supported during the downward travel of the ram 16 by a one-way cock 17, operated by ram rod 18. The feeding apparatus just described is substantially identical with that of my parent patent application and is operated in the same way. The gangue is discharged through a port 20, and the gases and volatiles are passed down a cavity 22 which is formed in the brickwork and communicates with the chamber 10, and into a chamber 23 adapted to be cooled by a water jacket 21 or other cooling means. The gases ascend from the chamber 23 through a second cavity 24 arranged in the brickwork and enter a main 1 which supplies the combustion chamber 11, where they are burnt with the necessary air, provided from a main 26 superposed on the structure. The air for combustion may be pre-heated by, for example, passing it through a jacket surrounding the gangue discharge 20, or otherwise.

The metal and impurities in the bath are separated according to their respective specific gravities and an alternative method of metal separation may be instanced in the case of the treatment by this process of a lead-zinc ore, the lead, by reason of its high specific gravity being separated from the zinc and being tapped from the bath at a different level, the metals being withdrawn in a liquid state.

Any residual metal vapour contained in the gases from the reducing chamber is oxidized in the combustion chamber, and is subsequently entrapped in suitable scrubbers and dust collectors, and either returned to the main charge or retained for use as oxide.

The gangue of the ore is continuously discharged from near the top of the retort and may be submitted to treatment by the addition of steam or water in such proportions that the steam or water and carbon of any residual fuel contained therein is converted to CO and hydrogen by the sensible heat of the gangue, and to a further cooling by pre-heating the air required for combustion and thereafter is conveniently disposed of after recovery of any valuable ingredients remaining therein.

The operation is as follows taking, for example, a complex sulphide ore carrying zinc 20, lead 5, antimony 3, sulphur 12, and accompanying siliceous gangue.

By my process 100 parts of this ore are intimately mixed with 40 parts of limestone and 15 parts of carbon.

Under the influence of the heat applied to the charge in the retort the limestone is decomposed and there ensues chemical interchange between the sulphur of the sulphides and the oxygen of the lime whereby the preponderating affinity of the calcium for sulphur causes the coincident formation of calcium sulphide.

The freed metals also have an opportunity to combine with the liberated oxygen of the lime and form oxides but these are immediately attacked by the carbon monoxide formed by interaction of the carbonic acid of the limestone with the free carbon of the coal charge and the metals will remain free.

In the case of zinc, the chemical reactions may be summarized as:—

$$ZnS + CaO + C = Zn(\text{vapour}) + CaS + CO$$

The retort temperature is sufficiently high to volatilize the free metals and these will leave the retort as a metallic fume with the retort gases, from which the metallic fume may be condensed by the application of suitable cooling apparatus, which in the apparatus shown is the water jacket 21.

If it is desired to increase the retort temperature by the combustion of more heating gas, my process permits the addition of limestone in excess of the above chemically required amount with its required carbon in the proportion of 100 of the former to 12 of the latter, the retort heat causing the dissociation of the limestone and the immediate formation of combustible carbon monxide.

The charge is fed into the reducing chamber as already described, and on reaching the top of the chamber the gangue is discharged through port 20, the gases and volatiles pass into the chamber 23, the gases being then introduced into the top of the combustion chamber, and the volatiles treated as above described.

The gases when burned are sufficient to produce the heat necessary for the chemical action and for the volatilization of the zinc, lead, and other volatilizable metals. The heat of the waste gases is utilized also for supplying heat for melting the condensed metal product or products. For this purpose the gases after burning in the chamber 11 are passed through the outlet passage 30 disposed adjacent the chamber 23. The metal in the chamber 23 can thus be withdrawn in a liquid state through the tap-hole 31.

The use of lime or limestone or other oxide or carbonate achieves the dual purpose (1) of producing a sufficiency of $CO_2$ which upon reaction with the carbon present in the charge, together with other carbon reactions if any, establishes a gas having a calorific value when suitably burned equal to the heat requirements of the whole charge together with the subsequent requirements of melting and refining the condensates, and (2) of providing a means for preventing the obnoxious liberation of sulphur dioxide in the waste exit gases by converting such sulphur to a sulphide, sulphite or sulphate by reaction and combination with the lime or limestone or other suitable oxide or carbonate mixed with the ore, the sulphide, sulphite or sulphate so formed being incorporated in the gangue.

The use of the present invention avoids the necessity of prior roasting for the purpose of driving off the sulphur as dioxide or the carbonic acid in the carbonates, and effects an efficient and economic recovery of zinc, lead and other such volatilizable metals from their ores, singly or jointly.

Further, the present invention provides a means of supplying the whole of the heat required for the treatment from the gases resulting from the reaction of the charge (after being once started by heating with extraneous fuel), the limestone or other carbonate contained in such charge not only augmenting the gas supply up to its calorific requirements, but at the same time affording a means of eliminating the sulphur components as calcium sulphide, sulphite or sulphate instead of its obnoxious elimination as sulphur dioxide.

What I claim and desire to secure by Letters Patent is:—

1. The method of reducing zinc, lead and like ores, in which the metal is capable of volatilization, consisting in introducing a charge of ore, carbon and limestone into the reducing chamber at the base thereof, heating the reducing chamber, raising the charge through progressively hotter zones inside the reducing chamber, collecting the volatilized metal and the gases, separating the metal and burning the gases in a combustion chamber contiguous to the reducing chamber, and discharging the gangue from the reducing chamber.

2. The method of reducing zinc, lead and like ores in which the metal is capable of volatilization, consisting in introducing a charge of ore, carbon and limestone into the reducing chamber at the base thereof, heating the reducing chamber, raising the charge through progressively hotter zones inside the reducing chamber, collecting the volatilized metal and the gases, separating the metal, burning the gases in a combustion chamber contiguous to the reducing chamber, the gases travelling downwards whilst burning in the combustion chamber, and discharging the gangue from the reducing chamber.

3. The method of reducing zinc, lead and like ores in which the metal is capable of volatilization, consisting in introducing a charge of ore, carbon and limestone into the reducing chamber at the base thereof, heating the reducing chamber, raising the charge through progressively hotter zones inside the reducing chamber, collecting the volatilized metal and the gases, separating the metal and burning the gases in a combustion chamber contiguous to the reducing chamber, the gases travelling downwards whilst burning in the combustion chamber, discharging the gangue from the reducing chamber, condensing and melting the volatilized metal and withdrawing it in a liquid state.

In testimony whereof, I affix my signature.

FREDERICK LINDLEY DUFFIELD.